(12) United States Patent
Lindberg et al.

(10) Patent No.: US 9,515,840 B2
(45) Date of Patent: Dec. 6, 2016

(54) LIGHT FITTING APPARATUS INTERFACING WITH A DATA COMMUNICATIONS NETWORK

(75) Inventors: Phil Lindberg, Helsinki (FI); Tomas Ivaskevicius, Helsinki (FI)

(73) Assignee: Nokia Corporation, Espoo (FI)

( * ) Notice: Subject to any disclaimer, the term of this patent is extended or adjusted under 35 U.S.C. 154(b) by 1004 days.

(21) Appl. No.: 12/976,183

(22) Filed: Dec. 22, 2010

(65) Prior Publication Data

US 2012/0163828 A1    Jun. 28, 2012

(51) Int. Cl.
*H04B 10/29* (2013.01)
*H04L 12/28* (2006.01)
*H04N 7/14* (2006.01)

(52) U.S. Cl.
CPC ..... *H04L 12/2816* (2013.01); *H04L 2012/285* (2013.01); *H04N 7/142* (2013.01)

(58) Field of Classification Search
CPC ...................................... H04L 67/12
USPC ........................................ 398/118
See application file for complete search history.

(56) References Cited

U.S. PATENT DOCUMENTS

| | | | |
|---|---|---|---|
| 6,400,968 B1 * | 6/2002 | White et al. | 455/572 |
| 7,460,006 B2 * | 12/2008 | Kates | G08B 1/08 340/425.1 |
| 2001/0005178 A1 | 6/2001 | Stewart | 342/457 |
| 2002/0197963 A1 | 12/2002 | Angermann et al. | 455/70 |
| 2004/0192227 A1 | 9/2004 | Beach et al. | 455/90.3 |
| 2004/0232851 A1 | 11/2004 | Roach, Jr. et al. | 315/160 |
| 2005/0185398 A1 * | 8/2005 | Scannell, Jr. | 362/227 |
| 2006/0152344 A1 | 7/2006 | Mowery, Jr. | 340/310.11 |
| 2006/0241816 A1 | 10/2006 | Draaijer | 700/286 |
| 2009/0206769 A1 * | 8/2009 | Biery et al. | 315/291 |
| 2009/0310577 A1 | 12/2009 | Kiribayashi | 370/338 |
| 2010/0141153 A1 * | 6/2010 | Recker et al. | 315/149 |
| 2011/0183716 A1 * | 7/2011 | Lamers | 455/558 |
| 2011/0275320 A1 * | 11/2011 | Pattenden | 455/41.2 |
| 2012/0250627 A1 * | 10/2012 | McCormack | H04L 12/282 370/328 |

FOREIGN PATENT DOCUMENTS

| | | |
|---|---|---|
| CN | 2700708 Y | 5/2005 |
| CN | 201114883 Y | 9/2008 |
| KR | 20090072446 A | 7/2009 |
| WO | WO 2006/129227 A2 | 12/2006 |
| WO | WO 2010/115801 A1 | 10/2010 |

OTHER PUBLICATIONS

"Light bulb phone charms" taken from www.coolest-gadgets.com, (2005-2010), (7 pages).
"Smoke detector & LED light bulb—Smoke Alarm Light" product information. Taken from www.alibaba.com, (3 pages).
"Indoor Light Bulb Nightvision Hidden Camera" product information. Taken from www.brickhousesecurity.com, (2010), (2 pages).

* cited by examiner

*Primary Examiner* — Shi K Li
(74) *Attorney, Agent, or Firm* — Harrington & Smith

(57) ABSTRACT

An apparatus including a galvanic connector configured to interconnect with a corresponding galvanic connector in an empty light fitting; a network interface configured to operate as a node in a data communications network; and a communications interface for enabling communication between an environment adjacent to the light fitting and the data communications network.

9 Claims, 4 Drawing Sheets

US 9,515,840 B2

LIGHT FITTING APPARATUS INTERFACING WITH A DATA COMMUNICATIONS NETWORK

TECHNOLOGICAL FIELD

Embodiments of the present invention relate to an apparatus. In particular, they relate to a novel network apparatus.

BACKGROUND

There is a convergence of technology in the field of mobile devices. It is not unusual for a single personal device to be capable of performing as a mobile cellular telephone, a personal digital assistant, an internet client, a network client, a gaming device, a media player (pictures, video, audio) and a media recorder (pictures, video, audio).

There has also been some convergence of technology in the field of home devices. For example, the functionality of a games console and a video player have been integrated.

There is a tendency, in field of home devices, to reuse existing hardware such as the processing power or the memory capacity of a home computer or a games console or the screen resolution of a large digital television.

However, reusing existing hardware perpetuates the patterns of behavior that have developed in association with that hardware.

BRIEF SUMMARY

According to various, but not necessarily all, embodiments of the invention there is provided an apparatus comprising: a galvanic connector configured to interconnect with a corresponding galvanic connector in an empty light fitting;
a network interface; and a communications interface for enabling communication between an environment adjacent to the light fitting and the data communications network.

According to various, but not necessarily all, embodiments of the invention there is provided an apparatus comprising: a first galvanic connector configured to interconnect with a corresponding galvanic connector in an empty light fitting;
a network interface; and a second galvanic connector configured to interconnect with an interchangeable unit that provides additional functionality wherein the additional functionality may be varied by interchanging units.

According to various, but not necessarily all, embodiments of the invention there is provided an interchangeable unit comprising: a galvanic connector configured to interconnect with a corresponding galvanic connector of a base unit that is configured to connect to an empty light fitting; functional circuitry configured to provide additional functionality to the base unit wherein the additional functionality may be varied by interchanging the interchangeable unit, wherein the interchangeable unit and the base unit, when connected, enable communication between an environment adjacent to the light fitting and a data communications network.

BRIEF DESCRIPTION

For a better understanding of various examples of embodiments of the present invention reference will now be made by way of example only to the accompanying drawings in which.

DETAILED DESCRIPTION

Figure 1:
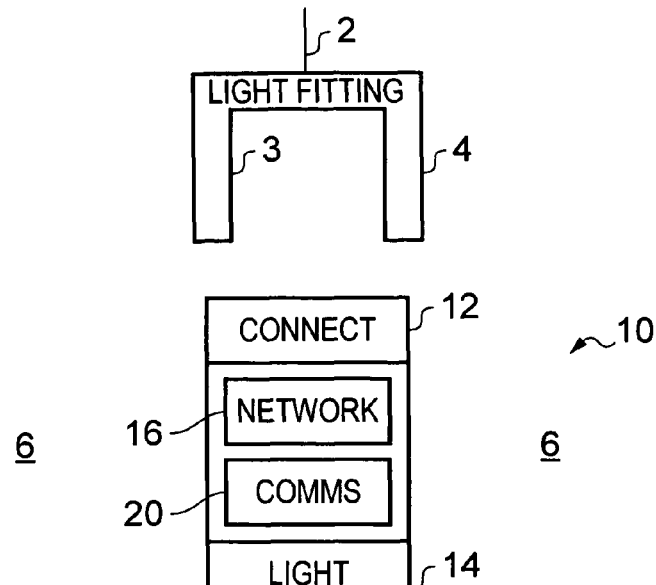
FIG. 1 illustrates an apparatus comprising: a galvanic connector configured to interconnect with a corresponding galvanic connector of an empty light fitting.

FIG. 1 illustrates an apparatus 10 comprising: a galvanic connector 12 configured to interconnect with a corresponding galvanic connector 3 in an empty light fitting 4; a network interface 16 configured to operate as a node in a data communications network; and a communications interface 20 for enabling communication between an environment 6 adjacent to the light fitting 4 and the data communications network 30.

In FIG. 1, a light fitting (fixture) 4 is connected to an electricity supply via wiring 2. The electricity supply may be an alternating current supply or a direct current supply. The light fitting 4 in the Figure is empty and a galvanic connector 3 is exposed. The galvanic connector 3 is configured to receive a galvanic connector (cap) of a standard lighting unit.

Although the light fitting illustrated resembles a pendant fitting, any suitable light fitting 4 may be used.

The term galvanic connector is used to indicate a connector that closes an electrical circuit via an Ohmic (resistive) connection, as opposed to an inductive or capacitive coupling.

The Figure also illustrates an apparatus 10 which is configured to be received in the empty light fitting 4 and to provide for communication between an environment 6 adjacent to the light fitting 4 and a data communications network.

The apparatus 10 comprises: a galvanic connector 12, a network interface 16 and a communications interface 20.

The communications interface 20 is configured to enable communication between an environment 6 adjacent to the light fitting 4 and the network interface 16.

The network interface 16 is configured to operate as a node in a data communications network.

The galvanic connector 12 is configured to interconnect with the corresponding galvanic connector 3 of the empty light fitting 4. The galvanic connector 12 has the same size and dimensions as a galvanic connector (cap) of a standard lighting unit for the light fitting 4.

In this example, the apparatus 10 also comprises an illumination source 14 powered via the galvanic connector 12. The illumination source 14 provides a luminance flux similar to that of a standard lighting unit for the light fitting 4. For example, the illumination source may have a luminous flux greater than 100 lumens at a defined wavelength. For example, if the illumination source has a broad spectrum (e.g. it appears white) then the luminous flux may be greater than 100 lux at 555 nm. If the illumination source has a narrow spectrum (e.g. it appears as a particular color) then the luminous flux may be greater than 100 lux at a central wavelength of the narrow spectrum.

The illumination source 14 may, for example, comprise one or a plurality of light emitting diodes. Alternatively it may, for example, comprise a light bulb, a fluorescent lamp, a halogen lamp or any other illumination source.

Figure 2:
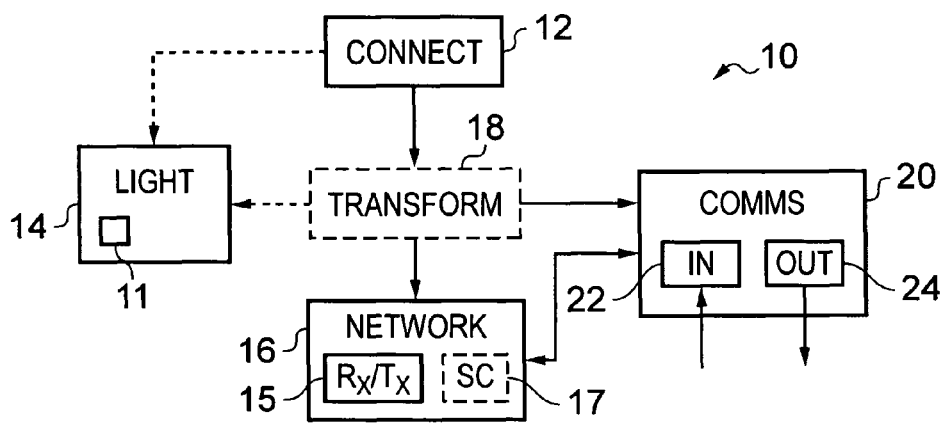
FIG. 2 illustrates another example of an apparatus comprising: a galvanic connector configured to interconnect with a corresponding galvanic connector of an empty light fitting.

FIG. 2 illustrates another example of the apparatus 10. Similar reference numerals are used to indicate similar features. This Figure illustrates how electrical power received via the galvanic connector 12 may be distributed to the illumination source 14, the communications interface 20 and the network interface 16.

In the illustrated example, the electrical power is provided as an alternating voltage to a transformer 18, which converts the alternating voltage to a direct current (DC) voltage before distributing the DC voltage to the illumination source 14, the communications interface 20 and the network interface 16. In some embodiments, the illumination source 14 may be supplied with power directly from the galvanic connector 12.

In other examples, the electrical power may be provided as a direct current (DC) voltage which is then distributed from the galvanic connector 12 to the illumination source 14, the communications interface 20 and the network interface 16.

The apparatus 10 may be provided with a user actuated control 11 that enables a user to controllably vary the luminous flux. For example, there may be different lux settings such as, for example, 100, 200, 300, 400 lux and the user may select one of the settings to control the luminous flux from the illumination source 14.

The communications interface 20 is a non-tactile interface in that communication is not via user touch.

The communications interface 20 may comprise an input interface 22 for data input. The input interface 22 is configured to communicate data dependent upon the environment 6 adjacent to the light fitting 4 to the network interface 16.

Figures 3A, 3B:
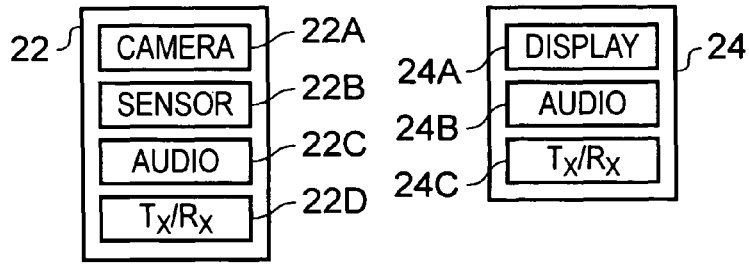
FIG. 3A illustrates an example of an input interface of a communications interface of the apparatus.
FIG. 3B illustrates an example of an output interface of a communications interface of the apparatus.

Referring to FIG. 3A, an input interface 22 in this example may comprise one or more of: a camera 22A, an environment sensor 22B, an audio input device 22C, a wireless transceiver 22D.

The environment sensor 22B may, for example, sense or detect one or more of smoke, temperature, carbon monoxide, motion within the environment 6.

The camera 22A may be a digital still camera and/or a digital video camera, for example.

The audio input device 22C may, for example, be a microphone. The microphone may, for example, be optimized for teleconferencing.

The communications interface 20 may comprise an output interface 24 for data output. The output interface 24 is configured to communicate data received from the network interface 16 into the environment 6 adjacent to the light fitting 4.

Referring to FIG. 3B, an output interface 24 in this example may comprise one or more of: a display device 24A, an audio output device 24B and a wireless transceiver 24C.

The display device 24A may, for example, be a projector for projecting an image onto a surface spaced from the apparatus 10 such as, for example, an underlying table.

The audio output device 24B may, for example, be a loudspeaker. The loudspeaker may, for example, be optimized for teleconferencing.

The single wireless transceiver may provide reception for the input interface 22 and transmission for the output interface 24.

Figure 4A:
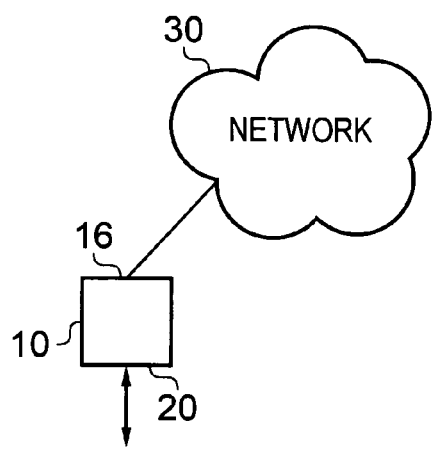
FIGS. 4A and 4B illustrate different network configurations.
Figure 4B:
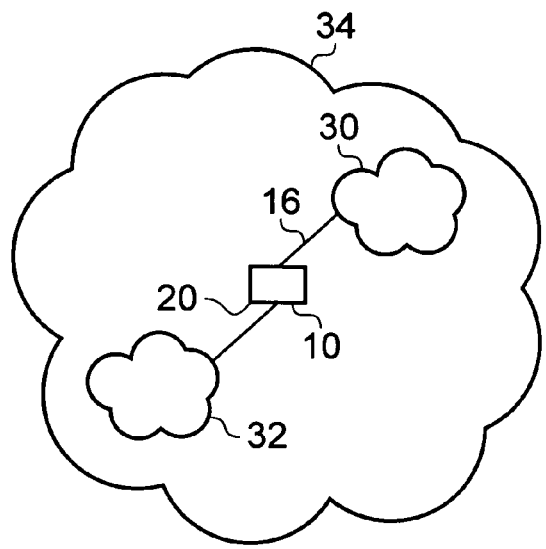

A wireless transceiver of the communications interface 20 may, for example, be configured to provide a network node in a local wireless network 32 (FIG. 4B). The local wireless network may, for example, be a radio network that has a range of less than 100 m. The local wireless network may, for example, be a wireless local area network (WLAN), a Bluetooth piconet or another type of radio network.

As illustrated in FIGS. 4A and 4B, the network interface 16 is configured to provide physical access to a networking medium. In these examples, the network interface 16 is configured to operate as a node in a data communications network 30.

The data communications network 30 is a network in which data is transmitted between a source and destination using the network interface 16. The apparatus 10 may be the source, or it may be the destination or it may be a node between the source and destination. The data may be transmitted as packet data. The network 30 may be a packet switched network.

In FIG. 4A, the network interface 16 is a terminal node in the data communications network 30. The communications interface 20 connects the network 30 through network interface 16 to environment 6.

In FIG. 4B, the network interface 16 is an interconnecting node between different networks 30, 32 forming a data communications network 34. The communications interface 20 connects the network 30 through network interface 16 to the wireless network 32.

In one embodiment, the network interface 16 may, for example, comprise a transceiver, for communication via the wiring 2.

In another embodiment, the network interface 16 may, for example, comprise a radio transceiver, for wireless communication.

A radio transceiver of the network interface 16 (if present) may, for example, be configured to provide a network node in a local wireless network 30. The local wireless network may, for example, be a radio network that has a range of less than 100 m. The local wireless network may, for example, be a wireless local area network (WLAN), a Bluetooth piconet or another type of radio network.

Alternatively, the radio transceiver of the network interface 16 (if present) may, for example, be configured to provide a network node in a public wireless network 30. The public wireless network 30 may, for example, be a radio network that is shared by multiple users and typically has a range of more than 100 m. The public wireless network may, for example, be a cellular telephone network or a wireless large area network (WLAN).

The network interface 16 may use a unique network identifier. In the example of FIG. 2, the unique network identifier may be stored on a replaceable smart card 17. If the network interface 16 is a radio transceiver for a cellular telephone system then the smart card may be subscriber identity module (SIM) or similar and the identifier may be the international mobile subscriber identifier (IMSI) or similar.

Figure 5A:
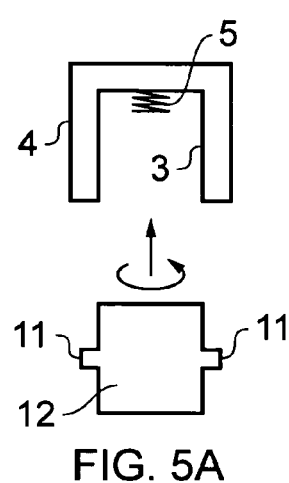
FIGS. 5A and 5B illustrate a bayonet light fitting.
Figure 5B:
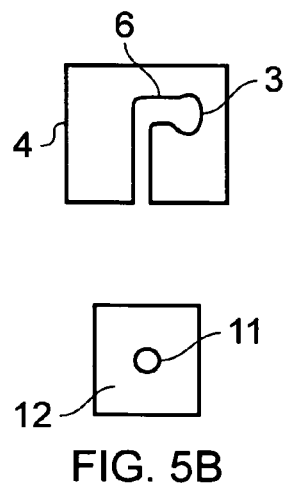
Figure 6:
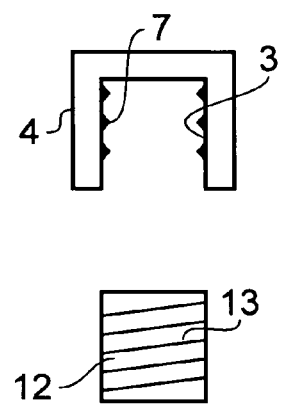
FIG. 6 illustrates an Edison screw light fitting.

FIGS. 5A and 5B illustrate one example of the galvanic connector 12 configured to interconnect with an empty light fitting 4. FIG. 6 illustrates another example of the galvanic connector 12 configured to interconnect with an empty light fitting 4.

The empty light fitting 4 is configured for interconnection with a standard lighting unit.

The galvanic connector 12 forms a "cap" or "base". This provides for electrical contact and also physical retention.

In FIGS. 5A and 5B, the light fitting is a bayonet light fitting. FIG. 5A is a front perspective view and FIG. 5B is a side perspective view.

The galvanic connector 12 is 'male' bayonet cap with one or more pins 11. The empty light fitting has a female L shaped slot 6 in its galvanic connector 3 and a spring 5.

The pin(s) 11 of the galvanic connector 12 are aligned with the slot(s) 6 of the light fitting 4 and pushed towards the light fitting 4 against the spring 5. When pin(s) 11 reach a base of the L shaped slot, the galvanic connector 12 (and the apparatus 10) is turned relative to the light fitting 4 to guide the pin across the base of the L shaped slot. The spring 5 presses the pin into a locking position at the end of the L shaped slot 6.

In FIG. 6, the light fitting is an Edison screw light fitting. The galvanic connector 12 has a screw thread 13 which by twisting is screwed into corresponding threads 7 on the interior surface of the galvanic connector 3 of the light fitting 4.

Figure 7:
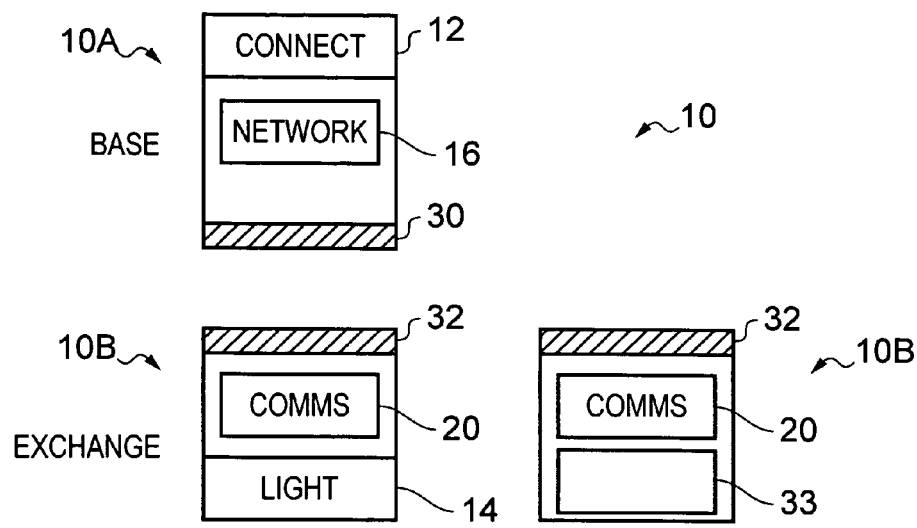
FIG. 7 illustrates an example of a modular apparatus comprising a base unit and one of a plurality of exchangeable units.

In FIG. 7, the apparatus 10 comprises a base unit 10A and an exchangeable unit 10B. The base unit 10A comprises the galvanic connector 12 and the network interface 16.

An interchangeable unit 10B and the base unit 10A, when connected, enable communication between an environment 6 adjacent to the light fitting 4 and a data communications network 30.

The base unit 10A comprises a second galvanic connector 30 configured to interconnect with a galvanic connector 32 of the exchangeable unit 10B.

The exchangeable unit 10B is configured to provide additional functionality to the base unit 10A. The additional functionality may be varied by interchanging the exchangeable unit 10B.

For example, in one example, the exchangeable unit 10B comprises at least part of the communications interface 20 and an illumination source 14.

In another example, the exchangeable unit 10B comprises at least part of the communications interface 20 and additional circuitry 33.

A communications interface 20 may, for example, comprise at least part of one or more of: a camera 22A, an environment sensor 22B, an audio input device 22C, a wireless transceiver, a display device 24A, an audio output device 24B.

The additional circuitry may comprise, for example, an illumination source 14 and/or a powered galvanic connector equivalent to a galvanic connector 3 of an empty light fitting 4.

Figure 8:
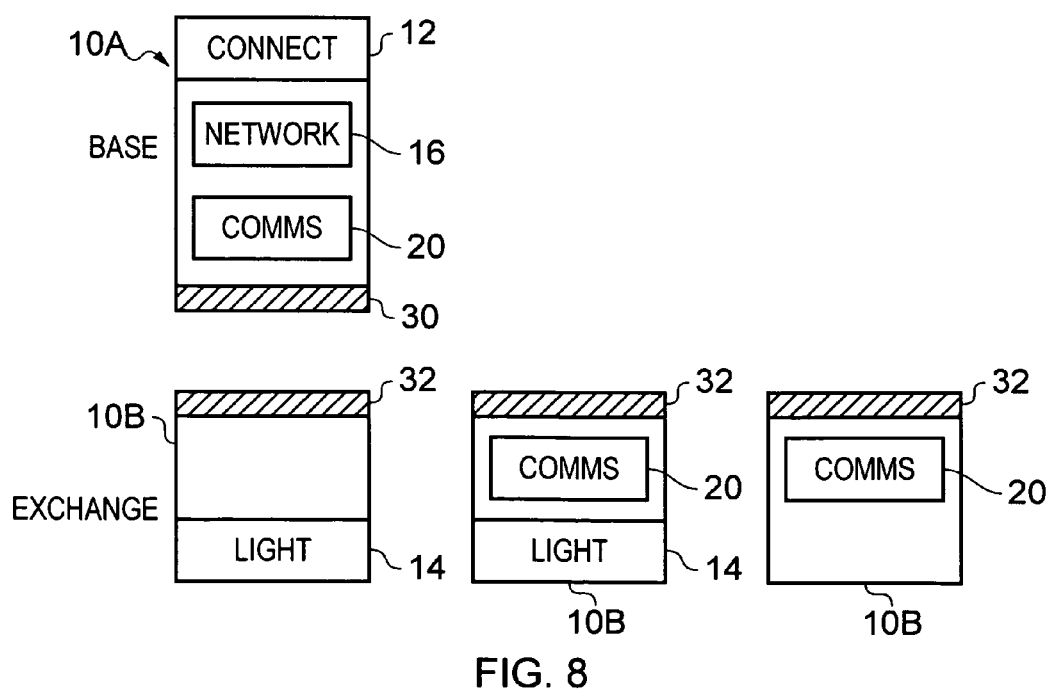
FIG. 8 illustrates another example of a modular apparatus comprising a base unit and one of a plurality of exchangeable units.

In FIG. 8, the apparatus 10 comprises a base unit 10A and an exchangeable unit 10B. The base unit 10A comprises the galvanic connector 12, the network interface 16 and at least part of the communications interface 20.

An interchangeable unit 10B and the base unit 10A, when connected, enable communication between an environment 6 adjacent to the light fitting 4 and a data communications network 30.

The base unit 10A comprises a second galvanic connector 30 configured to interconnect with a galvanic connector 32 of the exchangeable unit 10B.

The exchangeable unit 10B is configured to provide additional functionality to the base unit 10A. The additional functionality may be varied by interchanging the exchangeable unit 10B.

For example, in one example, the exchangeable unit 10B comprises at least an illumination source 14.

For example, in one example, the exchangeable unit 10B comprises at least part of the communications interface 20 and an illumination source 14.

For example, in one example, the exchangeable unit 10B comprises at least part of the communications interface 20 but not an illumination source 14.

An exchangeable unit 10B may also comprise additional circuitry 33.

A communications interface 20 may, for example, comprise at least part of one or more of: a camera 22A, an environment sensor 22B, an audio input device 22C, a wireless transceiver, a display device 24A, an audio output device 24B.

The additional circuitry may comprise, for example, an illumination source 14 and/or powered galvanic connector equivalent to a galvanic connector 3 of an empty light fitting 4.

Figure 9:
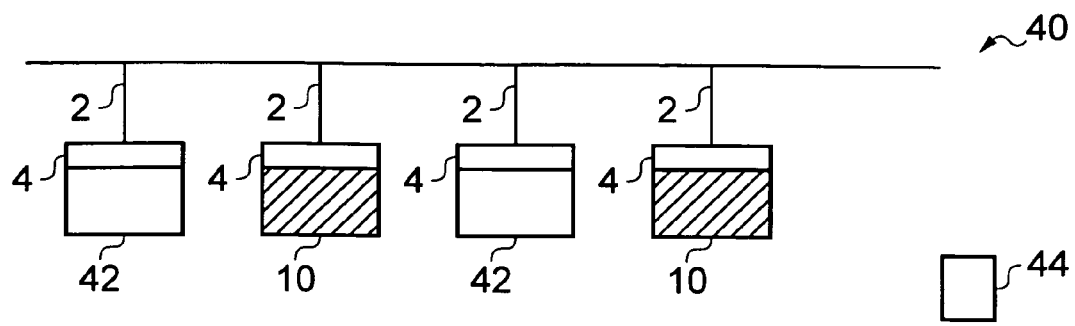
FIG. 9 illustrates a lighting system comprising: a plurality of fixed light fittings and wiring connecting the plurality of fixed light fittings.

FIG. 9 illustrates a lighting system 40 comprising: a plurality of fixed light fittings 4; and wiring 2 connecting the plurality of fixed light fittings 4.

Some of the light fittings 4 are connected to an apparatus 10. Some of the light fittings 4 are connected to a lighting unit 42. The lighting unit 42 may, for example, be a light bulb, a fluorescent lamp, a light emitting diode or a collection of light emitting diodes, a halogen lamp or any other illumination source.

In some embodiments, the multiple apparatus communicate with each other to form a network 32. The network 32 may, for example, be a wireless network.

Figure 10:
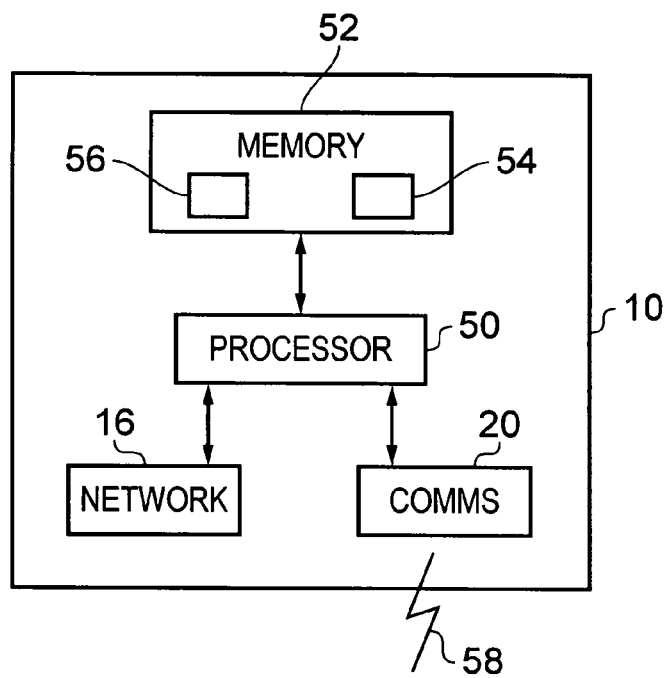
FIG. 10 illustrates another example of an apparatus comprising a processor and memory.

FIG. 10 illustrates another example of an apparatus 10. In this example, the apparatus 10 comprises at least one processor 50; at least one memory 52, the network interface 16 and the communications interface 20.

The processor 50 is operationally coupled to each of the memory 52, the network interface 16 and the communications interface 20 and any number or combination of intervening elements can exist (including no intervening elements).

The memory 52 stores first computer program code 54 and second computer program code or data 56.

The processor 50 is configured to read from and write to the memory 52. The processor 50 may also comprise an output interface via which data and/or commands are output by the processor 50 and an input interface via which data and/or commands are input to the processor 50.

The memory 52 stores a computer program 54 comprising computer program instructions that control the operation of the apparatus 10 when loaded into the processor 50. The computer program instructions 54 provide the logic and routines that enables the apparatus to perform the methods described.

The processor 50 by reading the memory 52 is able to load and execute the computer program 54.

The apparatus 10 therefore comprises: at least one processor 50; and at least one memory 52 including computer program code 54 the at least one memory 52 and the computer program code 54 configured to, with the at least one processor 50, cause the apparatus at least to control the communications interface 20 to transmit the second computer code 56 to a device 44 (FIG. 9).

The second computer code (or data) 56 enables the device 44 to communicate with the apparatus 10. It may for example, enable a device 44 that receives the second computer code (or data) 56 to form a network with the apparatus 10 and receive or provide data.

The computer program 54 may arrive at the apparatus 10 via any suitable delivery mechanism. The delivery mechanism may be, for example, a computer-readable storage medium, a computer program product, a memory device, a record medium such as a compact disc read-only memory (CD-ROM) or digital versatile disc (DVD), an article of manufacture that tangibly embodies the computer program 54. The delivery mechanism may be a signal configured to reliably transfer the computer program 54.

The apparatus 10 may propagate or transmit the computer program 54 as a computer data signal.

Although the memory 52 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc. As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device."

Figure 11:
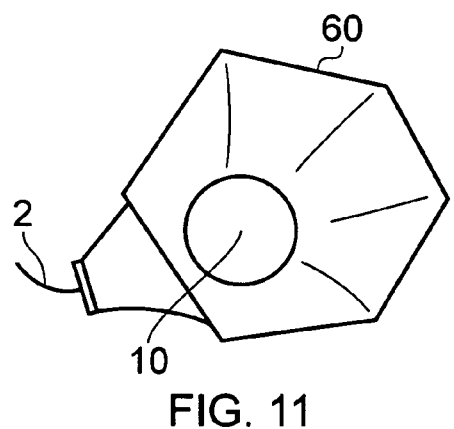
FIG. 11 schematically illustrates a fluted cover that operates to reflect and direct light and/or audio produced by the apparatus.

FIG. 11 schematically illustrates a fluted cover 60 that operates to reflect and direct light and/or audio produced by the apparatus 10. The cover 60 may, for example, be connected to the light fitting 4 in a manner similar to a conventional light shade. The cover 60 may differ from a conventional light shade in that it may be closed at one end. The sidewalls extend from the closed end to form a large fluted opening. In the illustrated example, six side walls extend to form a hexagonal opening. The cover 60 may be made from plastic or another suitable material.

As used here 'module' refers to a unit or apparatus that excludes certain parts/components that would be added by an end manufacturer or a user. The base unit 10A may be a module. The exchangeable units 10B are modules.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   a galvanic connector configured to interconnect with a corresponding galvanic connector in an empty light fitting;
   a network interface, wherein the network interface comprises a radio transceiver, for wireless communication, powered via the galvanic connector, and wherein the network interface uses a unique network identifier, wherein the network interface is configured to operate as a terminal node in the data communications network and is configured to operate as an interconnecting node between different networks forming the data communications network;
   a communications interface for enabling communication between an environment adjacent to the light fitting and a data communications network, wherein the communications interface is configured to communicate data dependent upon the environment adjacent to the light fitting to the network interface and is configured to communicate data, for transmission into the environment adjacent to the light fitting, from the network interface;
   a base unit including the galvanic connector and a second galvanic connector to directly receive an exchangeable unit's galvanic connector,
       wherein the exchangeable unit comprises at least part of the communications interface,
       wherein the exchangeable unit is configured to provide additional functionality to the base unit, and wherein the exchangeable unit is further configured to vary the additional functionality based upon interchanging the exchangeable unit;
an illumination source powered via the galvanic connector.

2. The apparatus of claim 1, wherein the unique network identifier is defined by a replaceable smart card.

3. The apparatus of claim 1, wherein the galvanic connector is configured to interconnect with an empty light fitting by twisting.

4. The apparatus of claim 1, further comprising at least one processor; and
at least one non-transitory memory including first computer program code and second computer program code,
the at least one non-transitory memory and the first computer program code configured to, with the at least one processor, cause the apparatus at least to control the communications interface to transmit the second computer code to a device, wherein the second computer code enables the device to communicate with the apparatus.

5. The apparatus of claim 1, wherein the exchangeable unit comprises an illumination source.

6. The apparatus of claim 1, further comprising a user actuated control enabling the user to control luminous flux level of the illumination source.

7. An apparatus comprising:
a galvanic connector configured to interconnect with a corresponding galvanic connector in an empty light fitting;
a network interface, wherein the network interface comprises a radio transceiver, for wireless communication, powered via the galvanic connector, and wherein the network interface uses a unique network identifier, wherein the network interface is configured to operate as a terminal node in the data communications network and is configured to operate as an interconnecting node between different networks forming the data communications network;
a communications interface for enabling communication between an environment adjacent to the light fitting and a data communications network, wherein the communications interface is configured to communicate data dependent upon the environment adjacent to the light fitting to the network interface and is configured to communicate data, for transmission into the environment adjacent to the light fitting, from the network interface;
a base unit including the galvanic connector and a second galvanic connector to directly receive an exchangeable unit's galvanic connector,
wherein the exchangeable unit comprises at least part of the communications interface,
wherein the exchangeable unit is configured to provide additional communication functionality for the network interface, and
wherein the exchangeable unit is further configured to vary the additional communication functionality based upon interchanging the exchangeable unit;
an illumination source powered via the galvanic connector.

8. The apparatus of claim 7, further comprising a user actuated control enabling the user to control luminous flux level of the illumination source.

9. An interchangeable unit comprising:
a galvanic connector configured to interconnect with a corresponding galvanic connector of a base unit that is configured to connect to an empty light fitting;
functional circuitry configured to provide additional functionality to the base unit wherein the additional functionality may be varied by interchanging the interchangeable unit, wherein the interchangeable unit and the base unit, when connected, enable communication between an environment adjacent to the light fitting and a data communications network;
a communications interface for enabling communication between an environment adjacent to the light fitting and the data communications network, wherein the communications interface is configured to communicate data dependent upon the environment adjacent to the light fitting to the network interface and is configured to communicate data, for transmission into the environment adjacent to the light fitting, from the network interface;
a network interface, wherein the network interface comprises a radio transceiver, for wireless communication, powered via the galvanic connector, and wherein the network interface uses a unique identifier, wherein the network interface is configured to operate as a terminal node in the data communications network and is configured to operate as an interconnecting node between different networks forming the data communications network; and
a second galvanic connector to directly connect with the base unit's galvanic connector,
wherein the base unit comprises at least part of the communications interface,
wherein the exchangeable unit is configured to provide additional functionality to the base unit, and
wherein the exchangeable unit is further configured to vary the additional functionality based upon base unit;
an illumination source powered via the galvanic connector.

* * * * *